(12) United States Patent
Gerbeling et al.

(10) Patent No.: US 7,781,036 B2
(45) Date of Patent: Aug. 24, 2010

(54) POUCH FOR STEAMING VEGETABLES

(75) Inventors: Gary L. Gerbeling, Minneapolis, MN (US); Thomas C. Hoese, Hopkins, MN (US); Scott Hemink, Deephaven, MN (US); Gregory Holl, Coon Rapids, MN (US); Anthony Gaylor, Lakeville, MN (US)

(73) Assignee: General Mills Marketing, Inc, Minneapolis, MN (US)

( * ) Notice: Subject to any disclaimer, the term of this patent is extended or adjusted under 35 U.S.C. 154(b) by 827 days.

(21) Appl. No.: 11/672,722

(22) Filed: Feb. 8, 2007

(65) Prior Publication Data
US 2007/0184154 A1    Aug. 9, 2007

Related U.S. Application Data

(60) Provisional application No. 60/771,243, filed on Feb. 8, 2006.

(51) Int. Cl.
*B29D 22/00* (2006.01)
*B29D 23/00* (2006.01)
*B32B 1/08* (2006.01)

(52) U.S. Cl. ............... 428/35.7; 428/346; 428/483

(58) Field of Classification Search ........... 428/35.2, 428/35.4, 35.5, 35.7, 36.7, 346, 483
See application file for complete search history.

(56) References Cited

U.S. PATENT DOCUMENTS

| 4,141,487 | A | * | 2/1979 | Faust et al. | ............. 229/120 |
| 4,691,374 | A | | 9/1987 | Watkins et al. | |
| 4,961,944 | A | | 10/1990 | Matoba et al. | |
| 6,596,355 | B1 | * | 7/2003 | Mita et al. | ............. 428/35.2 |
| 2002/0068668 | A1 | | 6/2002 | Chow et al. | |

FOREIGN PATENT DOCUMENTS

| CA | 2470054 A1 | 6/2003 |
| EP | 1295807 A1 | 3/2003 |
| EP | 933310 B1 | 3/2004 |
| WO | WO03/048001 A | 6/2003 |

* cited by examiner

*Primary Examiner*—Michael C Miggins
(74) *Attorney, Agent, or Firm*—Kyle T. Peterson; Thomas G. Dickson; Annette M. Frawley (57) ABSTRACT

A flexible pouch for cooking a food item using microwave energy. The pouch includes a base configured to retain hot gases above atmospheric pressure within the pouch to heat and cook the food item when the package is exposed to microwave energy. The pouch also includes a cover comprising a sealant layer and a score layer. The score layer includes a weak portion which ruptures and vents the pouch at a predictable location when pressure within the pouch due to the hot gasses exceeds a predetermined pressure.

19 Claims, 10 Drawing Sheets

POUCH FOR STEAMING VEGETABLES

CROSS-REFERENCE TO RELATED APPLICATIONS

This application claims the benefit of priority under 35 U.S.C. 119(e)(1) of a provisional patent application Ser. No. 60/771,243 filed Feb. 8, 2006 which is incorporated herein by reference in its entity.

FIELD OF THE INVENTION

The invention relates generally to cooking by means of microwave energy, and more particularly relates to a system utilizing a flexible pouch for containing and cooking a food product which regulates and maintains an elevated internal heat and pressure during the microwave cooking process.

BACKGROUND OF THE INVENTION

Preparing food products in a pouch is generally desirable. It permits the food product to be hygienically handled without direct contact with the food and it typically reduces or eliminates the need for cleaning cooking utensils. For example, it is known to boil a variety of foods including rice and pastas in net pouches. In doing so, the net pouch with rice or pasta is immersed into boiling water. After the food is cooked, the pouch is lifted out of the water. The pouch then acts as its own colander as the water drains from the food and out of the pouch through the spaces in the net.

The pouches described above are typically not used for certain types of food like vegetables or fish because cooking these types of food directly in water can result in the loss of vitamins and color from the food. The uptake of water can also result in a change in the structure of the product as well as in the product's overall flavor.

In response to the drawbacks caused by the direct exposure of certain foods to water during the cooking process, the "boil-in-bag" process has been developed. A boil-in-bag is a closed pouch which prevents contact between the food contained in the bag and the water along with the loss of vitamins and color described above. Moreover, boil-in-bag meals are often previously prepared cooked dishes in sauce which makes them unsuitable for being placed directly into water without any protective package. Such bags are very difficult to handle after boiling because the heat imparted due to the boiling is retained within the bag and may cause burns or other injury to the consumer when the bag is opened to access the food.

In response to the drawbacks of the boil-in-bag process described above, various types of disposable containers have been developed for use in heating or cooking foods in microwave ovens. For example, U.S. Pat. No. 4,961,944 to Matoba et al discloses a flexible pouch for use in cooking frozen foods. The food is filled into the pouch which is sealed and then frozen. The pouch has a number of holes covered by an adhesive strip. The adhesive strip is removed before microwaving to provide a vent for steam which is generated during the microwave cooking process.

Plastic containers having lids with pressure relief valves are also known such as disclosed in PCT Application PCT/CH98/00546. This application discloses use of a container having a tray and rigid cover. The cover has a pressure relief valve which opens and closes to maintain a predetermined pressure range for pressure cooking for fresh food in the container headed by a microwave. However, such packaging is relatively expensive and the shelf life for fresh foods is relatively short.

In view of the foregoing, there is a need for a low cost, low waste article and method of steaming frozen food products without encountering the drawbacks inherent in the prior art.

SUMMARY OF THE INVENTION

The invention generally includes a flexible pouch for use in microwave heating of frozen food that enables the product to be steamed during preparation. The pouch provides a predictable venting location, and is easily handled and opened when heating is complete. More specifically, the invention includes a flexible pouch for cooking a food item using microwave energy. The pouch includes a base configured to retain hot gases above atmospheric pressure within the pouch to heat and cook the food item when the package is exposed to microwave energy. The pouch also includes a cover comprising a sealant layer and a score layer. The score layer includes a weak portion which ruptures and vents the pouch at a predictable location when pressure within the pouch due to the hot gasses exceeds a predetermined pressure.

In an alternative embodiment, the invention includes a pouch meal including, a plurality of pieces of frozen food, a flexible pouch having an inner surface containing the food and an outer surface. The inner surface is defined by a base and a sealant layer. The base is configured to retain hot gasses above atmospheric pressure within the pouch to heat and cook the food when the pouch is exposed to microwave energy. The pouch also includes a score layer disposed over the sealant layer. The score layer includes a weak portion configured to rupture and vent the pouch at a predictable location when the pressure within the interior of the pouch due to hot gasses exceeds a predetermined pressure.

In yet another alternative embodiment, the invention includes a method of cooking a food item using microwave energy. The method comprises the steps of obtaining a pouch meal having a plurality of pieces of frozen food. The pouch has an inner surface containing the food and an outer surface, wherein the inner surface is defined by a base and a sealant layer. The pouch further includes a score layer disposed over the sealant layer. The score layer includes a weak portion configured to rupture and vent the pouch at a predictable location when the pressure within the interior of the pouch due to hot gasses exceeds a predetermined pressure.

The method also includes the step of cooking the food item with steam and hot gasses generated by heating the food item with microwave energy during a first phase of the cooking process. During this first phase of the cooking process, the sealant layer expands to hold the increased volume of hot gases until the sealant layer forms a permeable membrane. At this point, a second phase of the cooking process begins.

In the second phase of the cooking process steam and hot gasses are retained within the pouch by the base and score layer. Next, the pouch is ruptured at the weak portion of the score layer during a final phase of the cooking process.

During the final phase of the cooking process, the internal pressure of the pouch exceeds the predetermined pressure required to break the score layer at the weak portion to allow for release of excess pressure. Next, the method includes the step of venting some steam and hot gasses through the permeable sealant layer and weak portion of the score layer.

Finally, some steam and hot gasses are retained within the pouch to complete the heating and cooking of the food item.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENT

Figure 1:
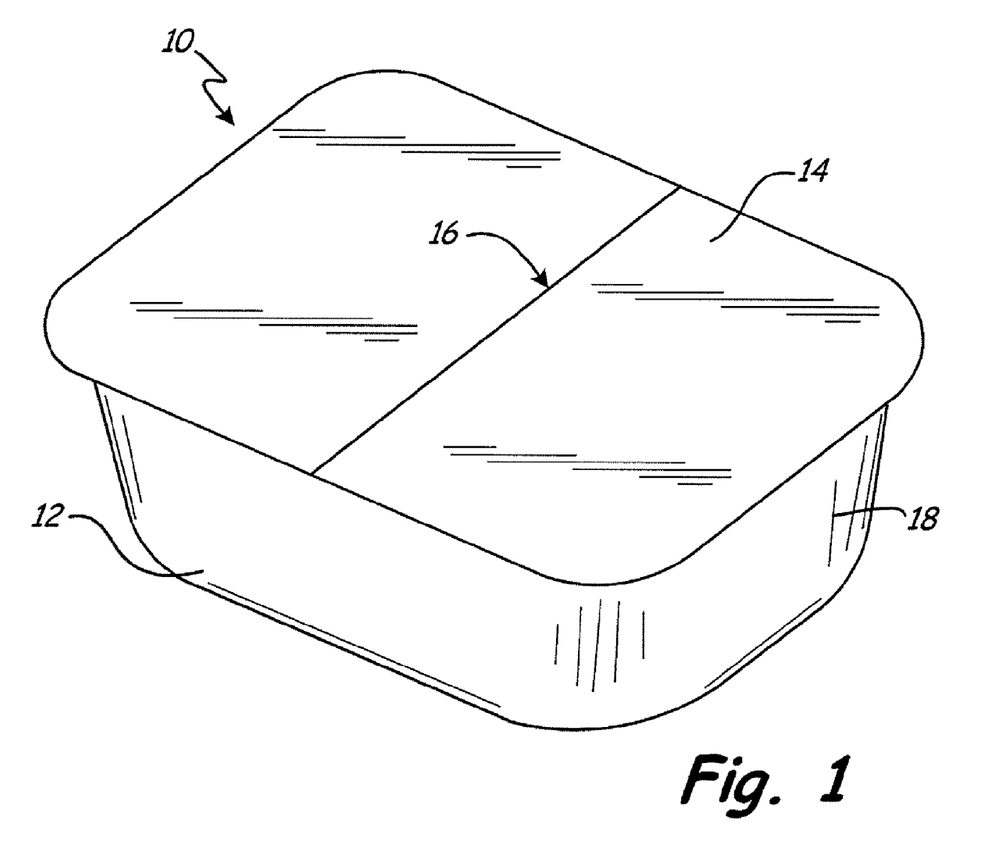
FIG. 1 shows an isometric view of the pouch of the present invention.
Figure 2:
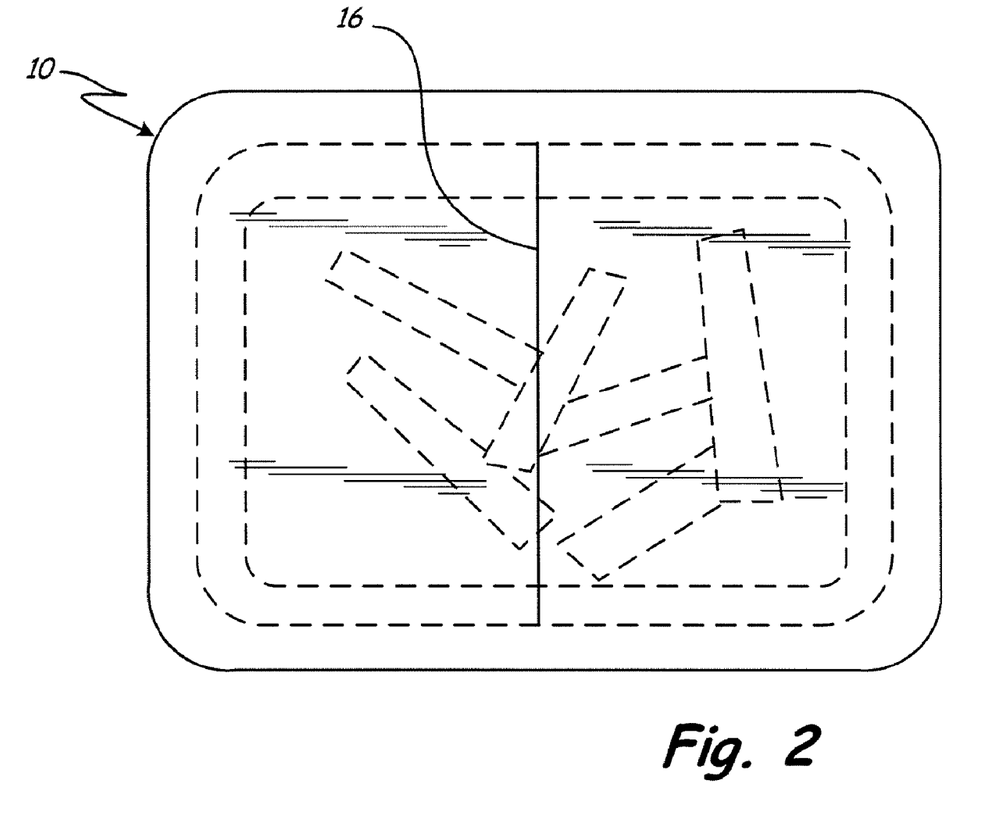
FIG. 2 shows a top view of the pouch of the present invention.

A flexible pouch 10 in accordance with the invention is shown in FIG. 1. Pouch 10 is generally defined by a base 12 and a cover 14. Base 12 includes a sidewall 18 and a bottom 20. Sidewall 18 extends upwardly from bottom 20, defining an interior 22 for containing a food item 24. Flange 26 extends radially outwardly relative to sidewall 18.

As shown in FIG. 1 base 12 generally forms a rectangular bowl, although a variety of shapes including round, triangular, irregular, or flat could be used while falling within the scope of the invention. Base 12 may also be fabricated from a variety of materials. In one embodiment, base 12 is an integrally thermoformed plastic material, such as polyolefins (e.g., polypropylene, polyethylene), blends of polyolefins, polystyrene—HIPS, or polyester resin-based materials—CPET, foamed polypropylene, polyethylene, paper and paper laminations with polypropylene, polyester, etc. In an alternative embodiment, base 12 may be fabricated using known injection molding or compression molding techniques.

Figure 3:
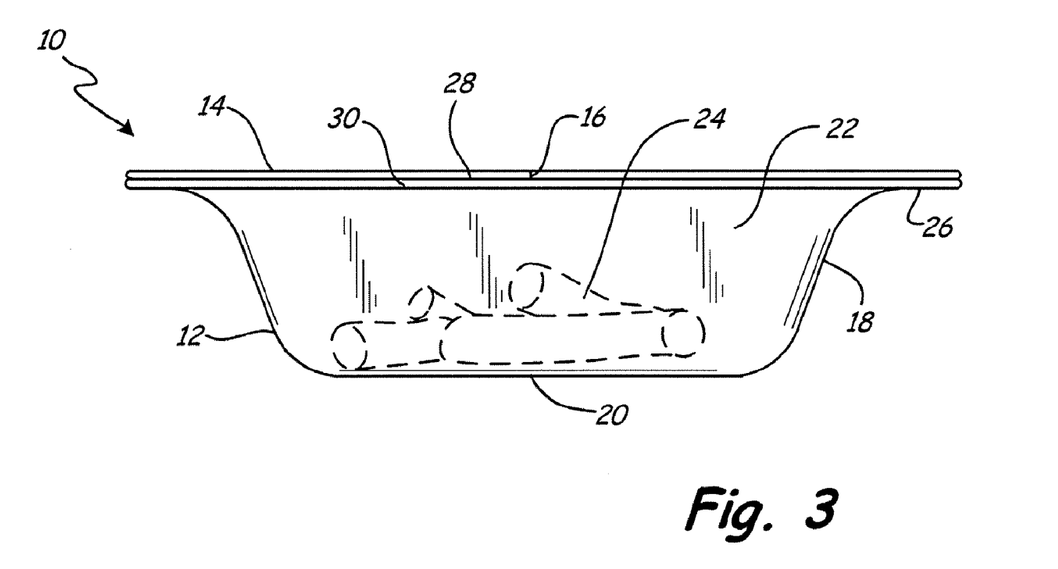
FIG. 3 shows a side cross sectional view of the pouch of the present invention before the heating process.

With reference to FIG. 3, the details of cover 14 will now be discussed. Cover 14 includes score layer 28 and sealant layer 30. In a preferred embodiment, score layer 28 and sealant layer 30 include a laminated film such as PET/PE.

The combination of sealant layer 30 and base 12 defines interior 22. Score layer 28 is disposed against sealant layer 30.

In one embodiment, score layer 28 is attached to sealant layer 30 with adhesive. In another embodiment. Score layer 28 may be thermally bonded to sealant layer 30.

Score layer 28 includes score 16. Score 16 does not extend to the sealant layer 30 of the cover 14, resulting in a completely sealed and enclosed pouch 10 containing food 24. In one embodiment, score 16 extends from a flange 26 on one side of the pouch 10 to another flange on an opposing side of the pouch. Score 16 may be mechanically formed in score layer 28. In alternative embodiments, score 16 may be chemically or thermally formed in score layer 28. By weakening the tensile strength of score layer 28 along score 16, score 16 provides a predictable rupture location along the score layer 28. In a one embodiment, the tensile strength of score layer 28 along score 16 is less than half the tensile strength of score layer 28 without score 16. In a preferred embodiment, the tensile strength of score layer 28 was measured to be approximately 17 lbs/in and the tensile strength of the score layer 28 along score 16 was measured to be approximately 7 lbs/in.

As shown in FIG. 3, bottom 20 of pouch 10 is generally flat. A flat bottom 20 promotes stable placement of the pouch 10 on a table top, in a microwave oven, or on another flat surface. In an alternative embodiment, bottom 12 may be concaved upwardly or inwardly relative to interior 22 of the pouch 10 to enhance microwave interaction with food items contained within pouch 10.

As shown in the drawings, sidewall 18 is continuous, extending radially outwardly and upwardly from bottom 20 until terminating at flange 26. It should be recognized however that, in a preferred embodiment, the components of base 12 and cover 14 are highly flexible and can form a wide variety of shapes.

With reference to FIGS. 3-10, the details of pouch 10 will now be discussed. When a user desires to heat the food 24, excess packaging material (not shown) is separated from pouch 10 and pouch 10 is placed in a microwave. The user then programs the microwave to heat for a desired cooking time. Although cooking time is dependant on a variety of factors, including quantity of food 24 and microwave power. Typical cooking times range from about 1 minute to about 10 minutes, preferably about 2 minutes to about 6 minutes, more preferably about 3 minutes to about 5 minutes.

Figure 4:
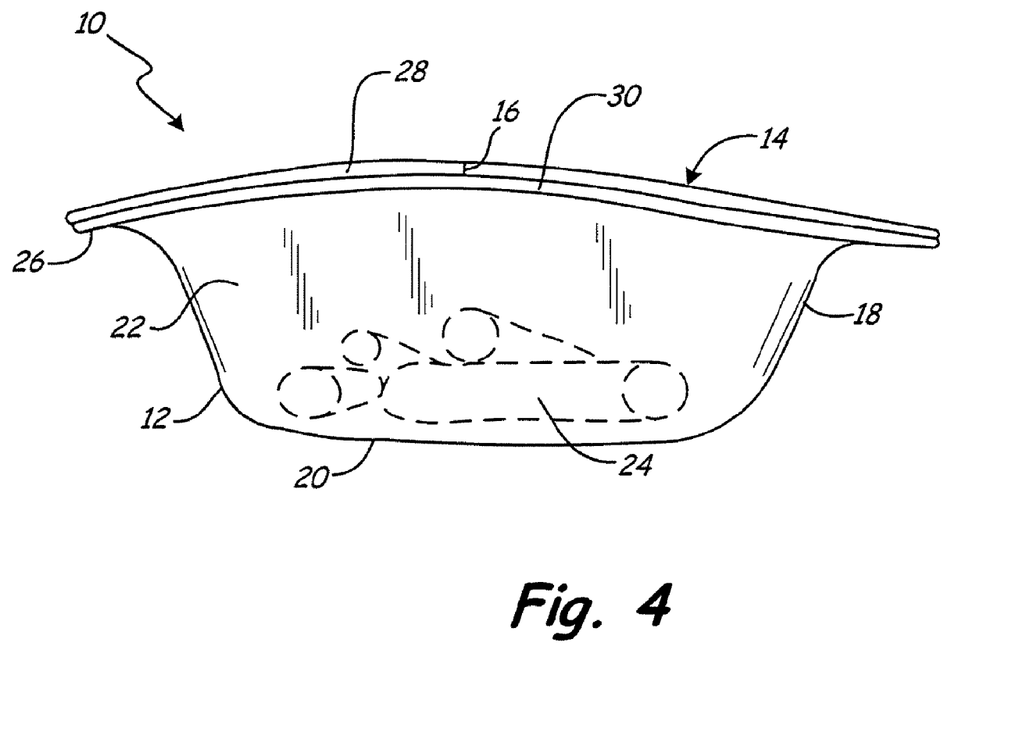
FIG. 4 shows a side cross sectional view of the pouch of the present invention during a first phase of the heating process.
Figure 5:
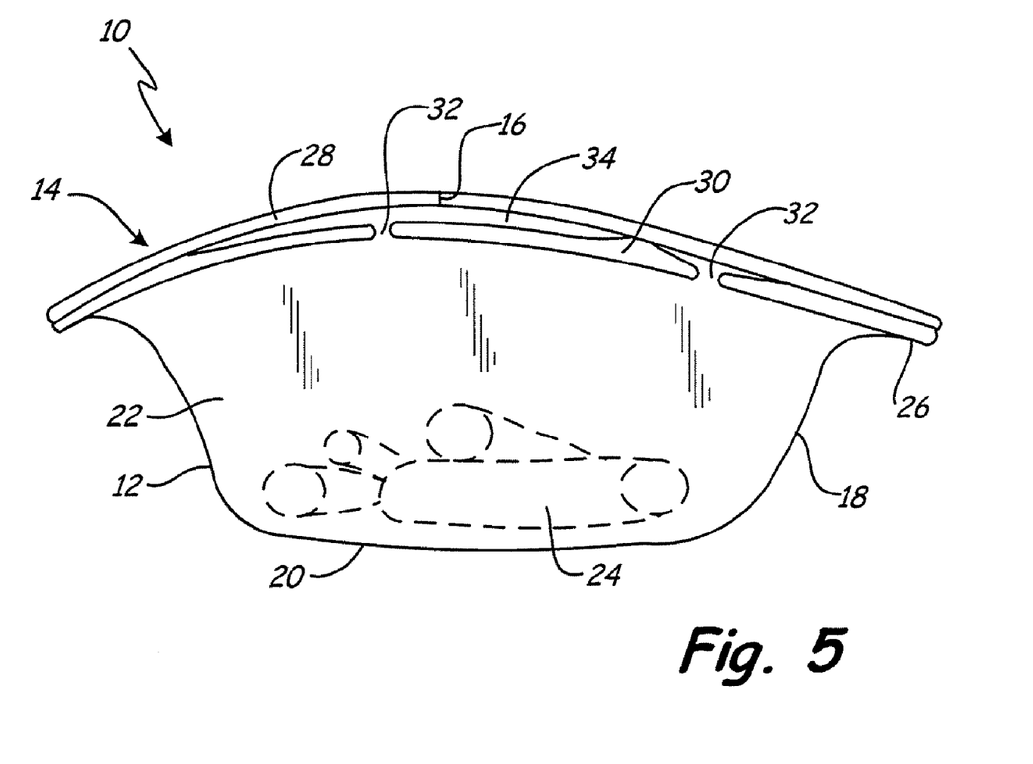
FIG. 5 shows a side cross sectional view of the pouch of the present invention during a second phase of the heating process.

When the microwave begins the cooking process, the pouch 10 generally comprises the cross sectional configuration shown in FIG. 3. During a first phase of the cooking process, steam and hot gasses are generated in the interior 22 of the pouch. The pouch then expands to hold the excess volume created by the steam formation as shown in FIG. 4. As the steam and hot gasses are generated cover 14 begins to bow in an upward direction as sealant layer 30 pushes against score layer 28.

As the cooking process continues, sealant layer 30 begins to stretch and deform to allow for increased volume on the interior 22 of the pouch 10 due to additional steam generation. At a second phase of the cooking process shown in FIG. 5, the sealant layer 30 fractures to form a permeable membrane that allows the steam to vent through various apertures 32. As the steam initially vents through apertures 32 sealant layer 30 may separate from score layer forming one or more pockets 34. The formation of pocket 34 increases the pressure on score layer 16 causing further deformation as steam and hot gasses are retained within the pouch by the base and score layer.

Figure 6:
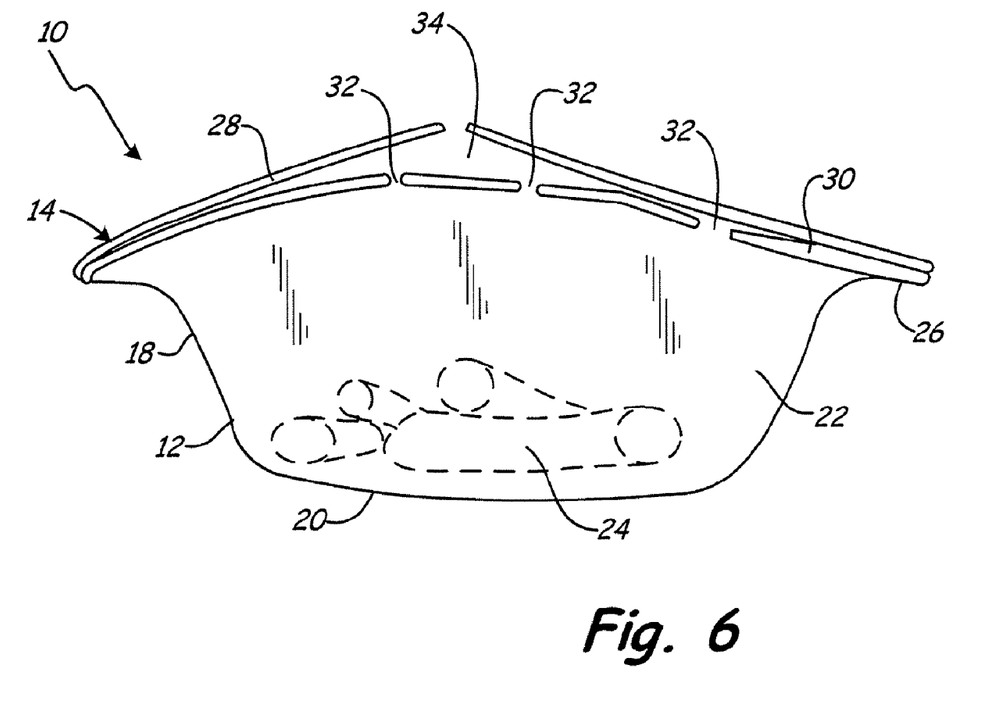
FIG. 6 shows a side cross sectional view of the pouch of the present invention during a final phase of the heating process.

During a final phase of the cooking process, the pressure in the interior 22 of the pouch 10 exceeds a predetermined pressure causing the pouch to rupture at the weak portion of the score layer 28 as shown in FIG. 6. Because the weakest portion of the score layer is along the score 16, the pouch 10 will rupture along the score resulting in a predictable venting location near the end of the heating. In this configuration, some steam and hot gasses are permitted to vent through the permeable sealant layer and weak portion of the score layer while other steam and hot gasses are retained within the pouch to complete the heating and cooking of the food item.

Once the cooking process is completed, the pouch 10 is removed from the microwave. In a preferred embodiment, the user removes the pouch 10 from the microwave by grasping the flange 26 on opposing sides of the pouch 10. The flange 26 provides a convenient and intuitive location on the pouch 10 for the user to hold. The location of the flange 26 relative to the food 24 enables the flange 26 to cool at a relatively rapid rate allowing the user to remove the pouch 10 from the microwave without discomfort.

Figure 7:
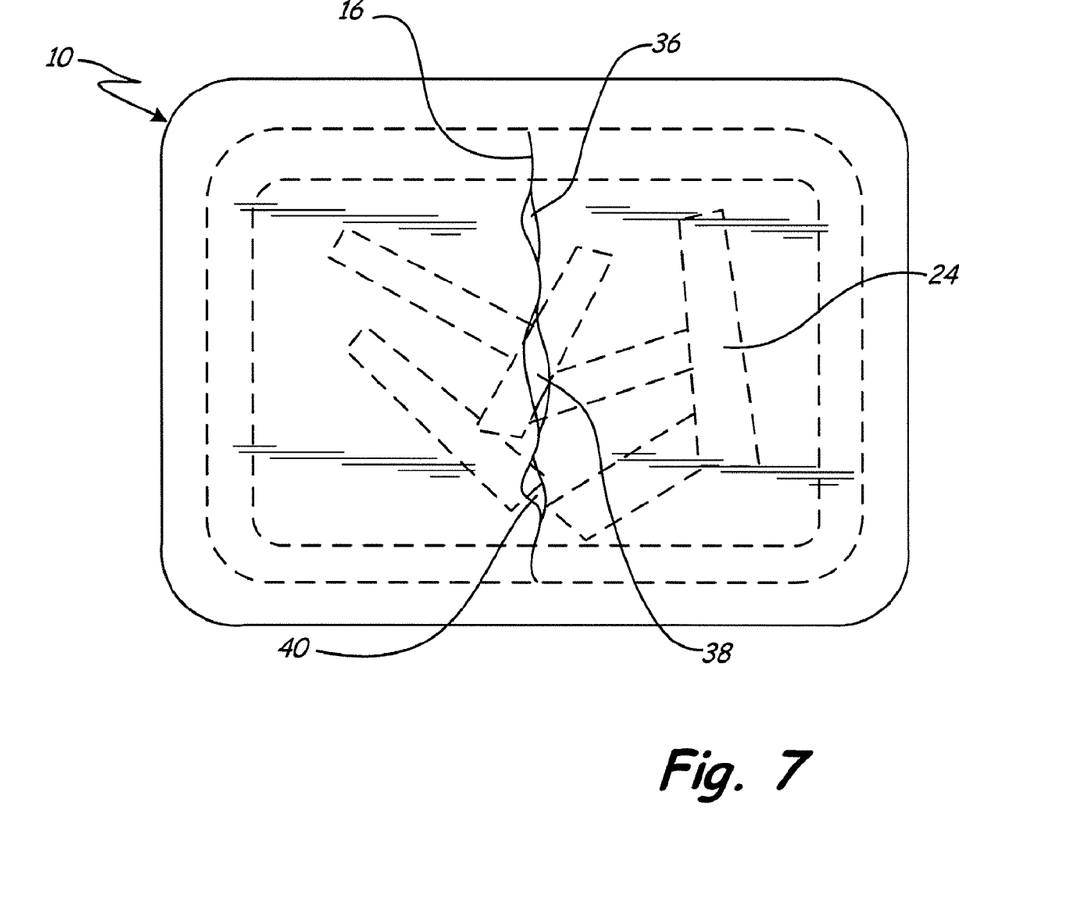
FIG. 7 shows a top view of the pouch of the present invention during a final phase of the heating process.

FIG. 7 illustrates a top view of the pouch 10 after the cooking process is completed but before the food 24 is removed from the pouch. In a preferred embodiment, score 16 remains identifiable. However, score 16 contains apertures 36, 38, and 40 which allowed the steam and hot gasses to escape from the interior 22 of the pouch 10 during the cooking process. Although three apertures 36, 38, and 40 are shown in FIG. 7 for purposes of illustration, it is important to note that any number of apertures can be formed along score 16 while remaining within the scope of the invention.

Figure 8:
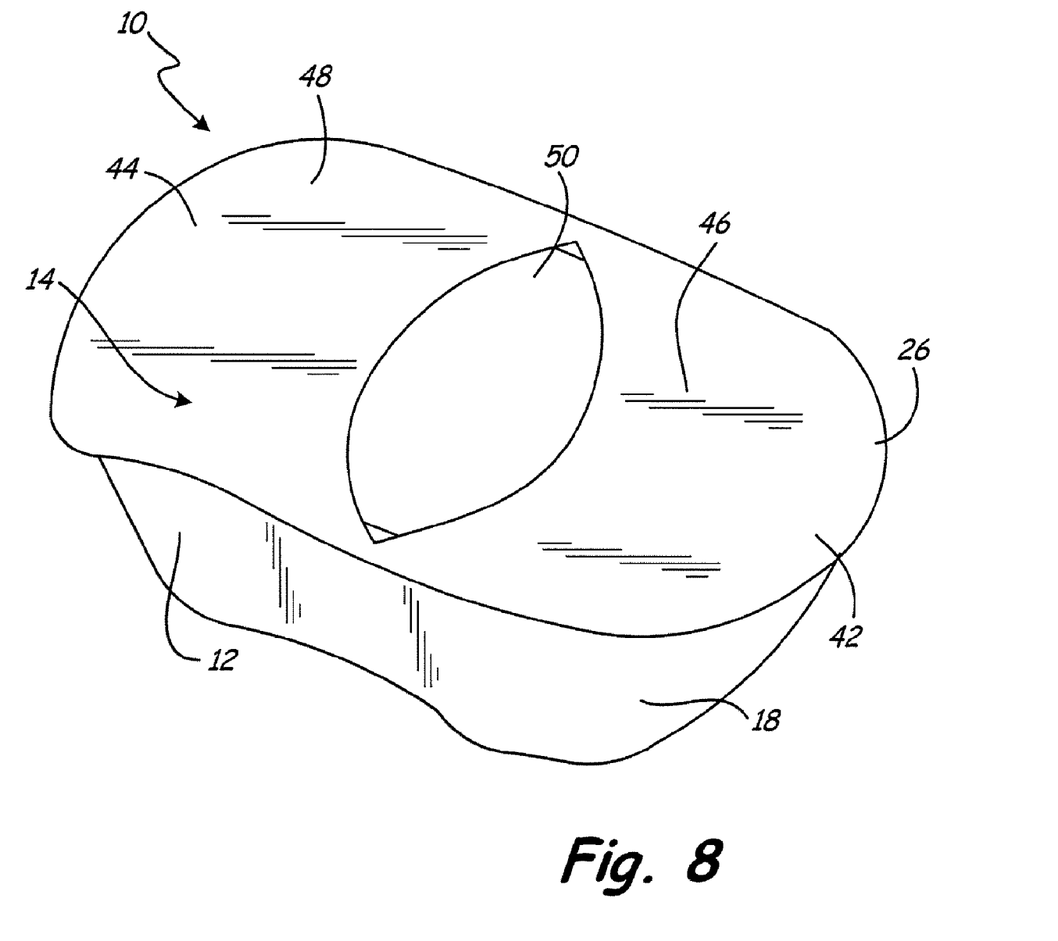
FIG. 8 shows an isometric view of the pouch of the present invention in an opened position.

With reference to FIG. 8, the removal of the food 24 from the pouch 10 will now be discussed. The configuration of score 16 upon completion of the cooking process provides a natural location for removal of the food 24. However, in most instances the apertures 36, 38, and 40 need to be combined into a single opening 50 to facilitate easy removal of the food.

To create opening 50, the user grasps the flange 26 at locations transverse to the score 16. Using one hand to grasp point 42 and another hand to grasp point 44, the user pulls point 42 and point 44 apart. As the distance between point 42 and 44 increases, apertures 36, 38, and 40 expand to form a single opening 50. This configuration also provides a convenient location for the users hands away from the heat of any remaining steam that may be escaping from pouch 10. At this point, the food 24 can be easily removed from the container.

It is important to recognize that score 16 can be located in a variety of locations along score layer 28 while remaining within the scope of the invention. For example, in FIGS. 7 and 8, score 16 is centrally located between points 42 and 44. However, it may desirable to position score 16 closer to point 44 to facilitate the removal of large or elongated foods from pouch 10. In a preferred embodiment, pouch 10 incorporates an easy peel material to enable the cover 14 to be removed from the base 12 without a scissors or a knife. This aspect of the invention further allows for the removal of large items from the pouch 10.

Figure 9:
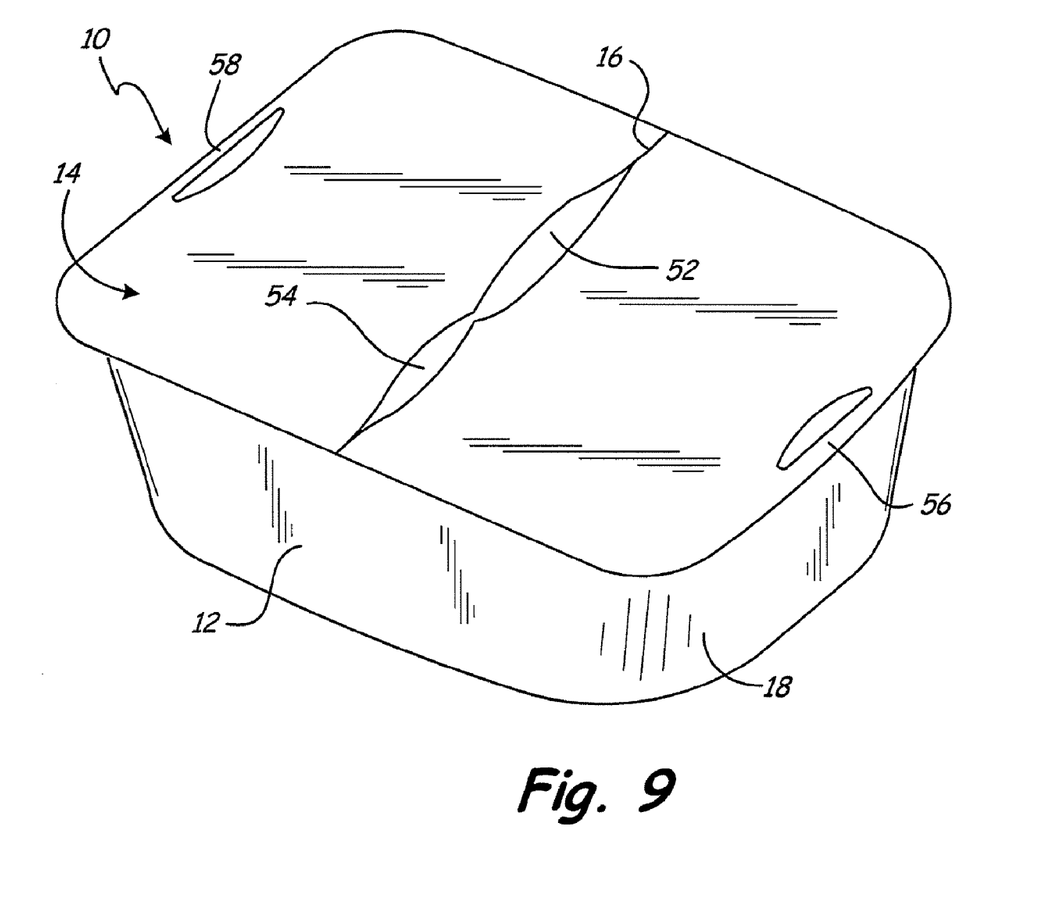
FIG. 9 shows an isometric view of an alternative embodiment of the pouch during a final phase of the heating process.
Figure 10:
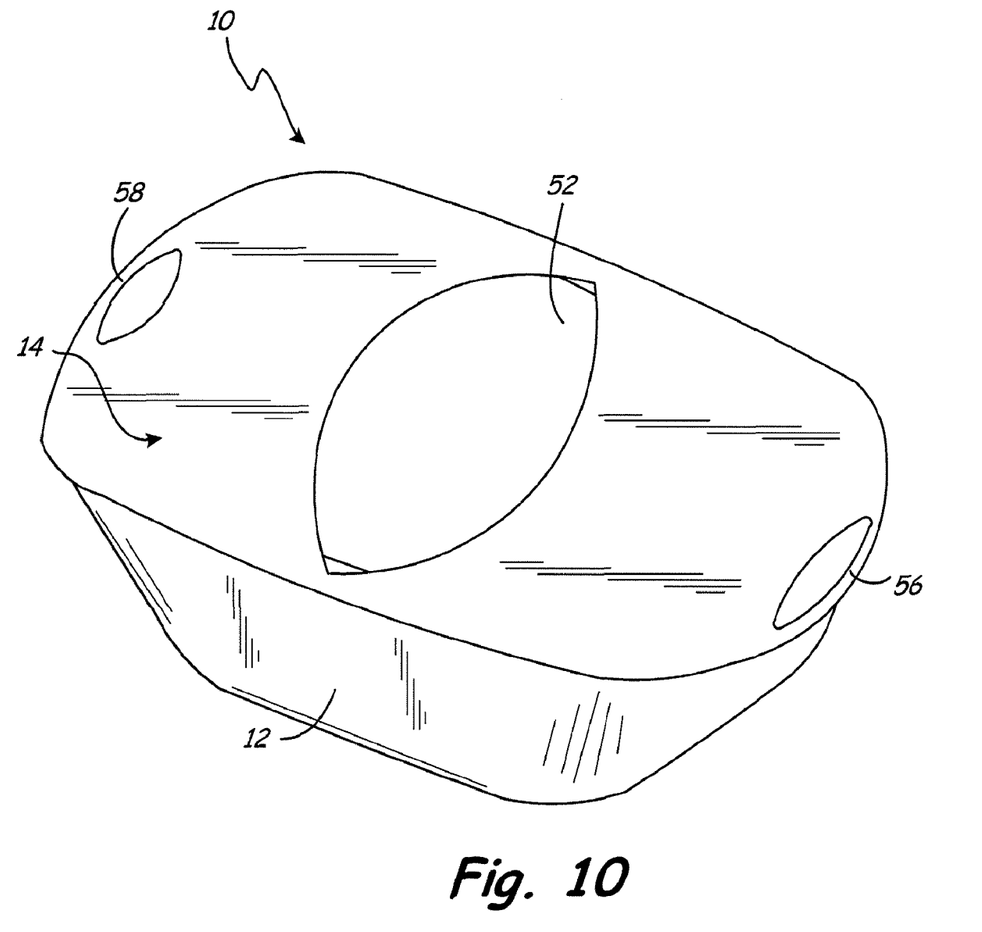
FIG. 10 shows an isometric view of an alternative embodiment of the pouch of the present invention in an opened position.

With reference to FIGS. 9 and 10, an alternative embodiment of pouch 10 will now be discussed. FIG. 9 shows two apertures 52 and 54 that are formed along score 16 upon completion of the cooking process. Again, it is necessary to combine apertures 52 and 54 along score 16 to create a single opening 50 to facilitate easy removal of some food products.

To create opening 50, the user grasps handles 56 and 58. Handles 56 and 58 are disposed near the flange 26 at locations transverse to the score 16. Using one hand to grasp handle 56 and another hand to grasp handle 58, the user pulls handle 56 and handle 58 apart. As the distance between handle 56 and handle 58 increases, apertures 52 and 54 expand to form a single opening 50. This configuration also provides a convenient location for the users hands away from the heat of any remaining steam that may be escaping from pouch 10. At this point, the food 24 can be easily removed from the container.

In another embodiment, pouch 10 may consist essentially of a cover 14. A score 16 is disposed in cover 14 to provide a predictable venting location. This embodiment has the advantage of simplifying the manufacturing process as only a single material is used to make the pouch 10.

Pouch 10 may be used for a variety of food items, including individually frozen predominately carbohydrate ingredients, individually frozen predominately vegetable ingredients, individually frozen predominately meat based ingredients, and combinations thereof, although a wide variety of food items may be used while remaining within the scope of the invention.

Although the invention has been described with reference to preferred embodiments, workers of ordinary skill will recognize that changes can be made in form and detail without departing from the spirit and scope of the invention.

What is claimed is:

1. A flexible pouch for cooking a food item using microwave energy, the pouch comprising:
    a base configured to retain hot gases above atmospheric pressure within the pouch to heat and cook the food item when the package is exposed to microwave energy;
    a cover comprising
    a sealant layer adapted to form a permeable membrane when pressure within the pouch exceeds a first predetermined pressure, and
    a score layer, wherein the score layer includes a weak portion which ruptures and vents the pouch at a predictable location when pressure within the pouch due to the hot gasses exceeds a second predetermined pressure.

2. The pouch of claim 1, wherein the weak portion is mechanically formed in the score layer.

3. The pouch of claim 1, wherein the weak portion is laser scored in the score layer.

4. The pouch of claim 1, wherein the base is configured to retain said liquid within the pouch upon heating.

5. The pouch of claim 1, wherein the pouch further comprises a plurality of handles to facilitate opening of the pouch.

6. The pouch of claim 1, wherein the tensile strength of the score layer is greater than the tensile strength of the sealant layer.

7. The pouch of claim 6, wherein the score layer is fastened to the sealant layer with adhesive.

8. The pouch of claim 1, further comprising a plurality of pieces of frozen food.

9. The pouch of claim 8, wherein the food is selected from the group consisting of individually frozen predominately carbohydrate ingredients, individually frozen predominately vegetable ingredients, individually frozen predominately meat based ingredients and combinations thereof.

10. The pouch of claim 8, wherein the plurality of pieces of frozen food further comprises a frozen liquid.

11. A pouch meal comprising:
    a plurality of pieces of frozen food;
    a flexible pouch having an inner surface containing the food and an outer surface, wherein the inner surface is defined by:
    a base configured to retain hot gasses above atmospheric pressure within the pouch to heat and cook the food when the pouch is exposed to microwave energy, and
    a sealant layer adapted to form a permeable membrane when pressure within the pouch exceeds a first predetermined pressure; and
    a score layer disposed over the sealant layer, the score layer having a weak portion configured to rupture and vent the pouch at a predictable location when the pressure within the interior of the pouch due to hot gasses exceeds a second predetermined pressure.

12. The meal of claim 11, wherein the weak portion is laser scored in the score layer.

13. The meal of claim 11, wherein the weak portion is mechanically formed in the score layer.

14. The meal of claim 13, wherein the tensile strength of the score layer at a location adjacent to the score is greater than the tensile strength of the sealant layer.

15. The meal of claim 14, wherein the tensile strength of the score layer at the weak portion is greater than the tensile strength of the sealant layer.

16. The meal of claim 15, wherein the score layer is fastened to the sealant layer.

17. The meal of claim 16, wherein the food is selected from the group consisting of individually frozen predominately carbohydrate ingredients, individually frozen predominately vegetable ingredients, individually frozen predominately meat based ingredients, and combinations thereof.

18. The meal of claim 17, wherein the base is configured to retain said liquid within the pouch upon heating.

19. The meal of claim 18, wherein the pouch further comprises a plurality of handles to facilitate opening of the pouch.

* * * * *